(No Model.)
M. L. HORNER.
TOOTH FOR THRASHING MACHINES.
No. 282,027. Patented July 24, 1883.
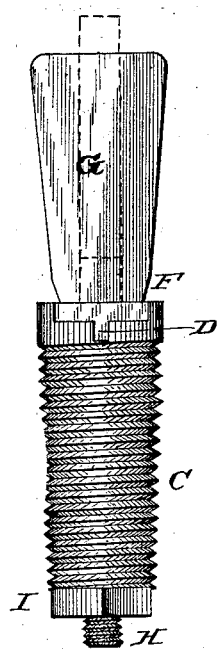
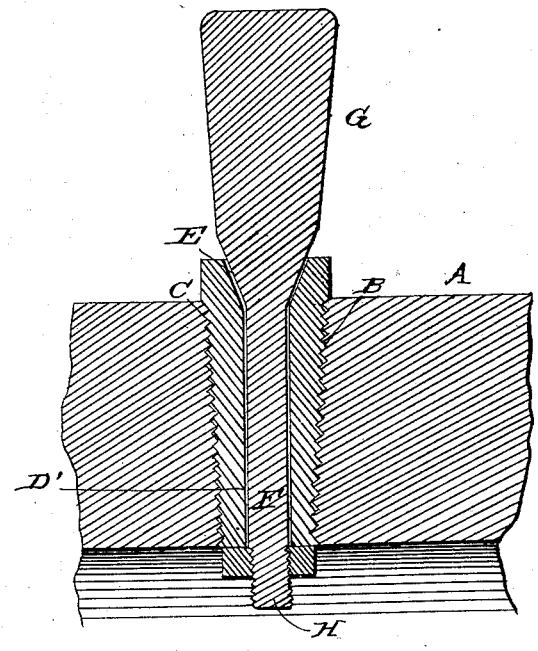
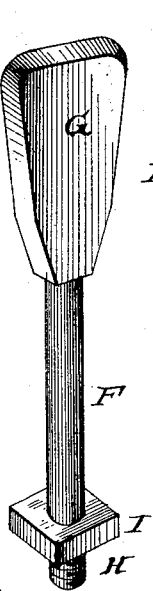
WITNESSES:
Fred. G. Dieterich
M. L. Collamer
INVENTOR.
Malachi L. Horner,
by C. A. Snow & Co,
ATTORNEYS.

UNITED STATES PATENT OFFICE.

MALACHI L. HORNER, OF AUBURN, NEW JERSEY.

TOOTH FOR THRASHING-MACHINES.

SPECIFICATION forming part of Letters Patent No. 282,027, dated July 24, 1883.

Application filed June 17, 1882. Renewed May 1, 1883. (No model.)

*To all whom it may concern:*

Be it known that I, MALACHI L. HORNER, of Auburn, in the county of Salem and State of New Jersey, have invented certain new and useful Improvements in Teeth for Thrashing-Machines; and I do hereby declare that the following is a full, clear, and exact description of the invention, which will enable others skilled in the art to which it appertains to make and use the same, reference being had to the accompanying drawings, which form a part of this specification.

This invention relates to means for securing teeth to the cylinders or concaves of thrashing-machines, and has for its object to provide a ready and efficient means for adjustment.

To this end it consists in certain improvements in the construction and arrangement of parts.

In the drawings, Figure 1 is a side view of a tooth and collar constituting my invention. Fig. 2 is a sectional view of the same applied to a portion of the cylinder; and Fig. 3 is a detail view, in perspective, of the parts comprising the former detached.

Referring by letter to the drawings, A designates the cylinder or concave bed, which is provided with the desired number of screw-threaded openings B, in which is screwed a cylindrical collar or socket, C, the latter being provided with suitable recesses, D D, to be engaged by the screw-driver. Collar C is provided with a central perforation, D, circular in form, but extended or flaring at its mouth E, in which perforation is inserted the correspondingly-shaped shank F of the tooth G. The shank F is screw-threaded on its end H, which projects from the collar inside cylinder A, on which end works a nut, I, against the under side of collar C.

J is a transverse pin, which may be passed through end H to retain the nut in place.

The operation and advantages of my invention will be readily understood. The tooth is readily adjusted and securely retained in place, and may be fitted in the socket, either as shown in full lines or as shown in dotted lines, Fig. 1, and when in position cannot turn.

I claim and desire to secure by Letters Patent—

1. The combination, with a screw-threaded collar or thimble having a central opening with a flaring mouth, of a tooth having a correspondingly-shaped shank, and means for securing the two together, as set forth.

2. The combination of the support having a screw-threaded opening, an externally screw-threaded collar or thimble having a circular central opening with a flaring-mouth, and the tooth having a correspondingly-shaped shank, with means for securing it in the thimble, as set forth.

In testimony that I claim the foregoing as my own I have hereto affixed my signature, in presence of two witnesses.

MALACHI L. HORNER.

Witnesses:
JOHN H. TURNER,
WM. Z. FLITCRAFT.